Aug. 27, 1940.  E. S. MacPHERSON  2,213,010
AUTOMOBILE BODY
Filed Aug. 5, 1935  14 Sheets-Sheet 2
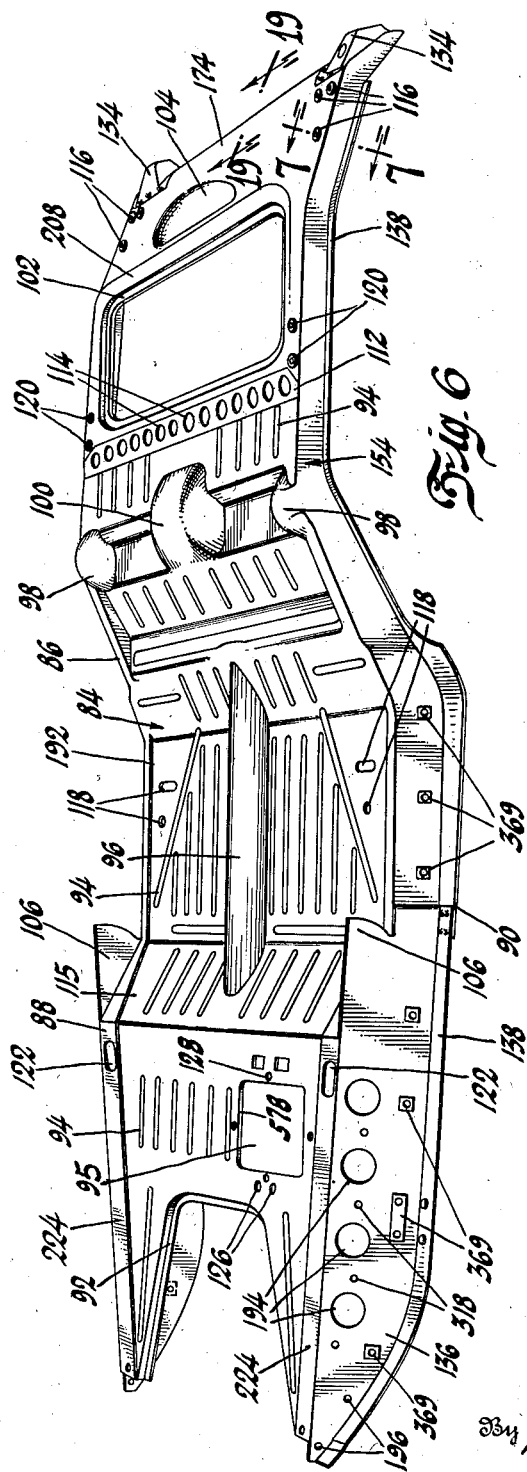
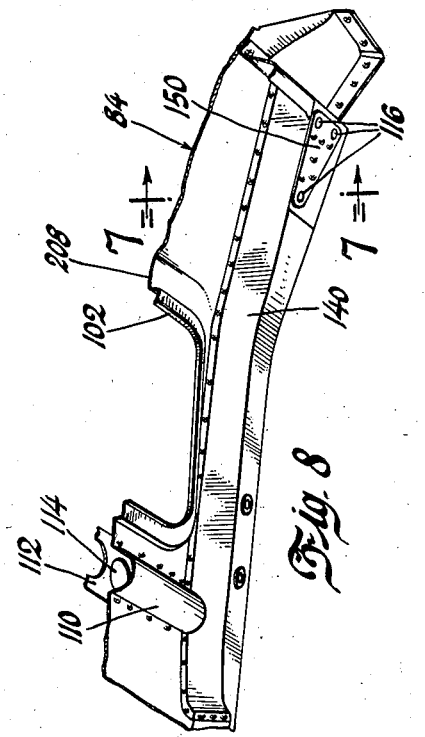
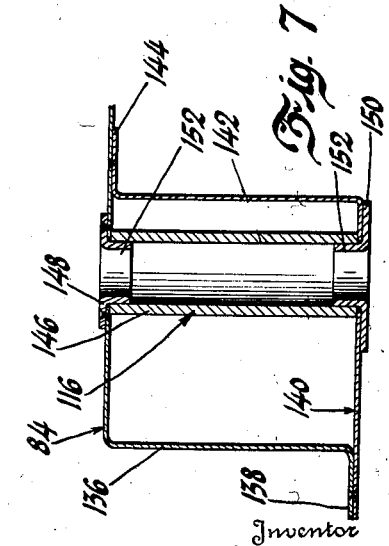
Inventor
Earle S. MacPherson
By Blackmore, Spencer & Flint
Attorneys

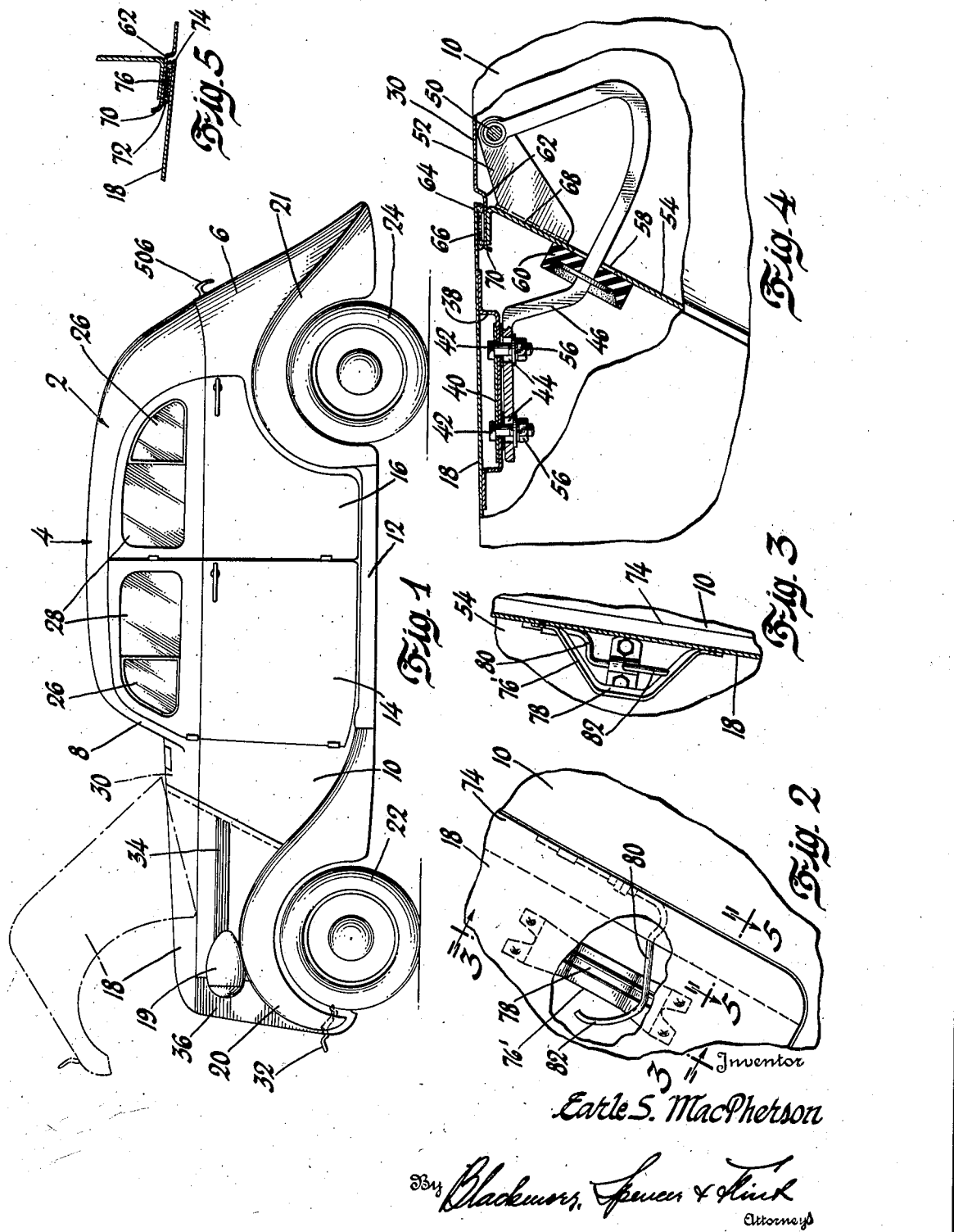

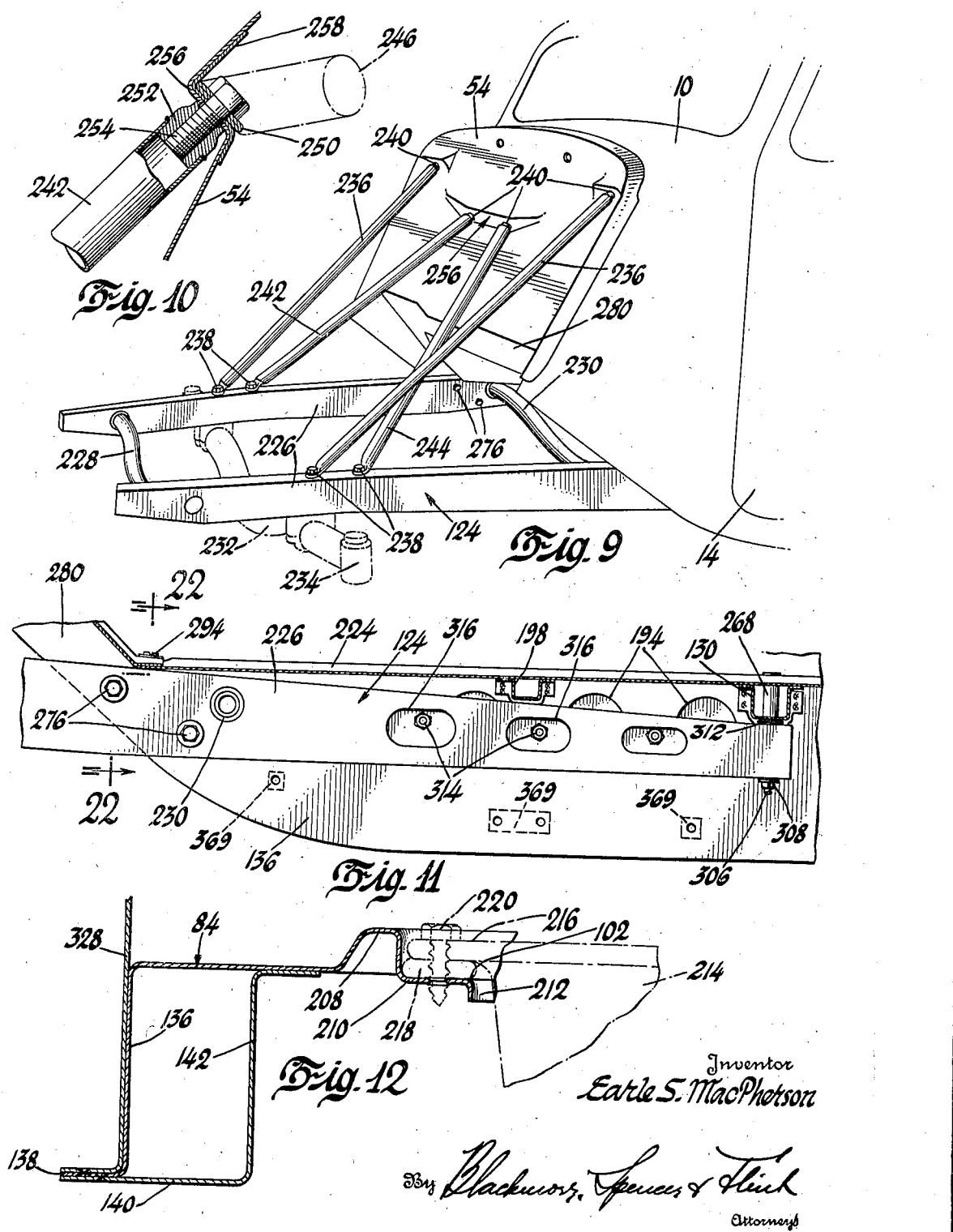

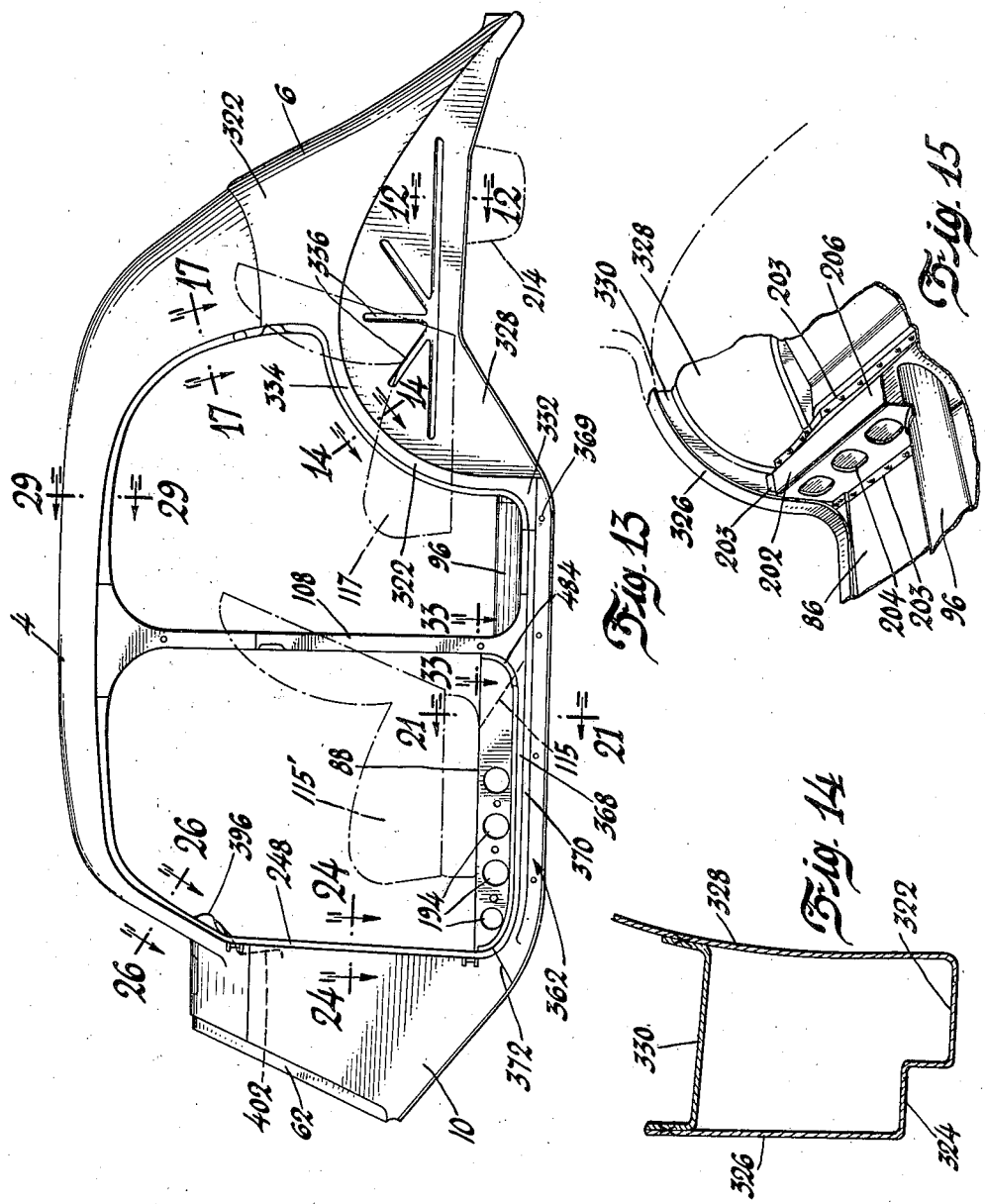

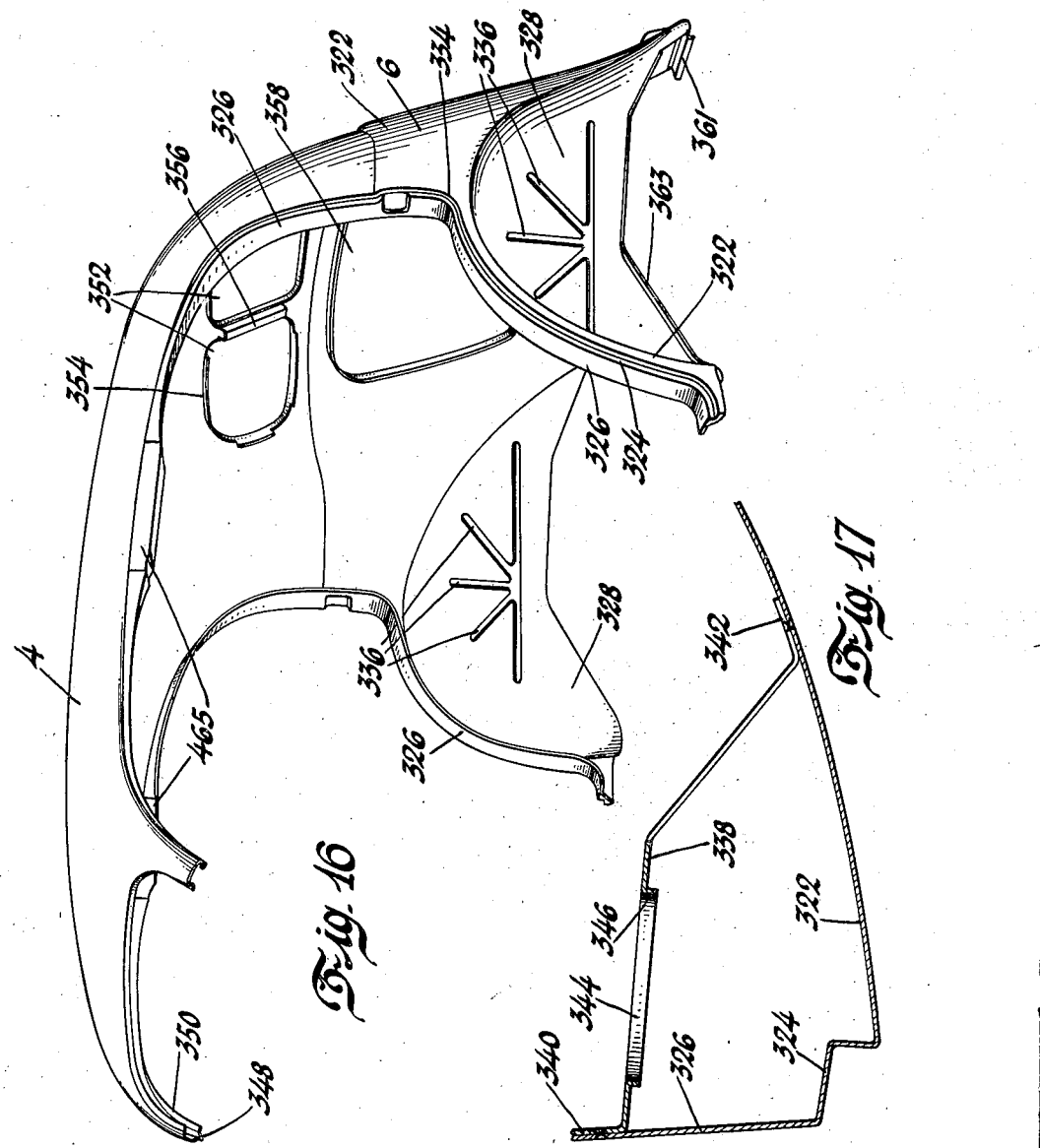

Aug. 27, 1940. E. S. MacPHERSON 2,213,010
AUTOMOBILE BODY
Filed Aug. 5, 1935 14 Sheets-Sheet 6
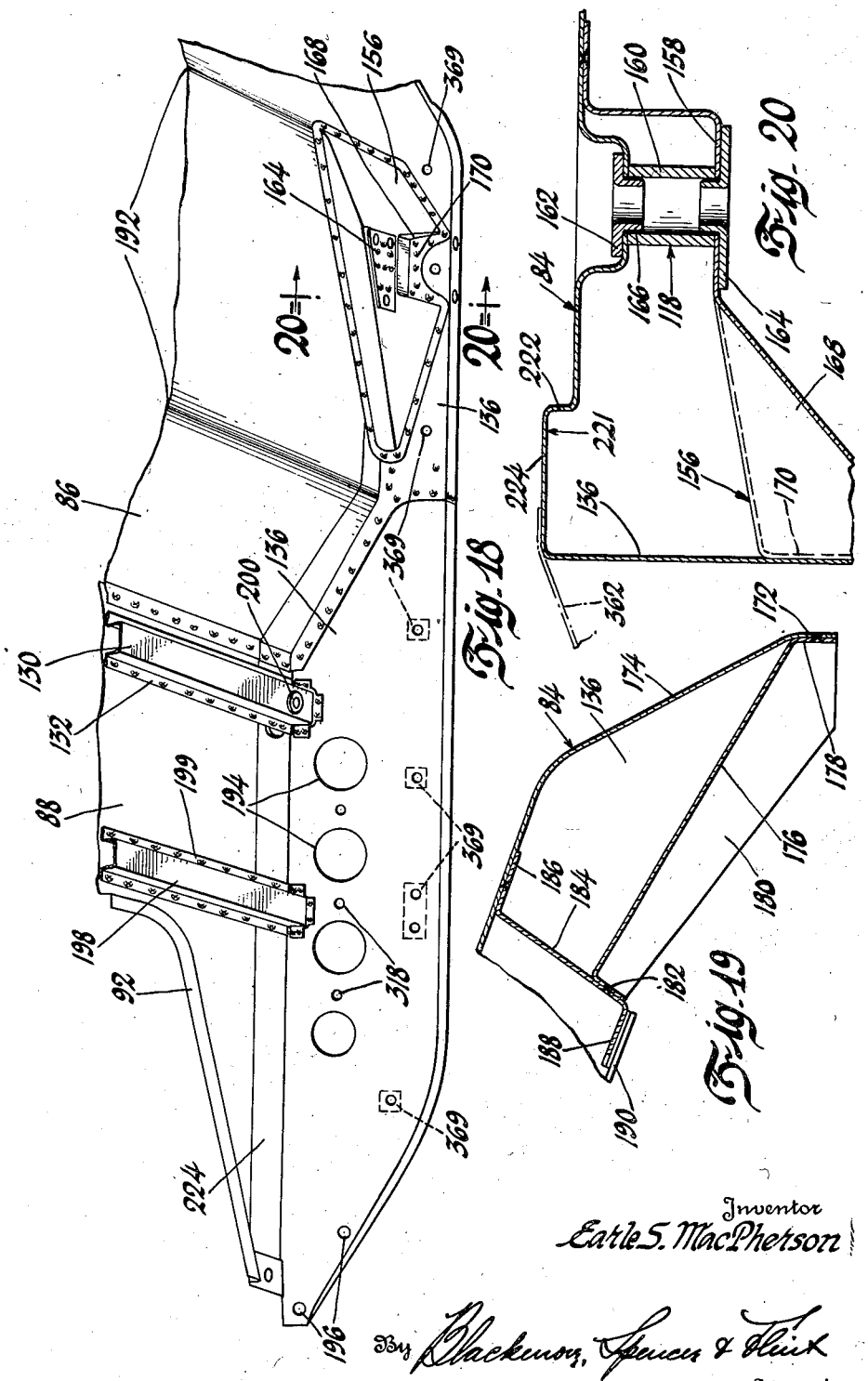

Aug. 27, 1940.   E. S. MacPHERSON   2,213,010
AUTOMOBILE BODY
Filed Aug. 5, 1935   14 Sheets-Sheet 7

Inventor
Earle S. MacPherson
By Blackmore, Spencer & Flint
Attorneys

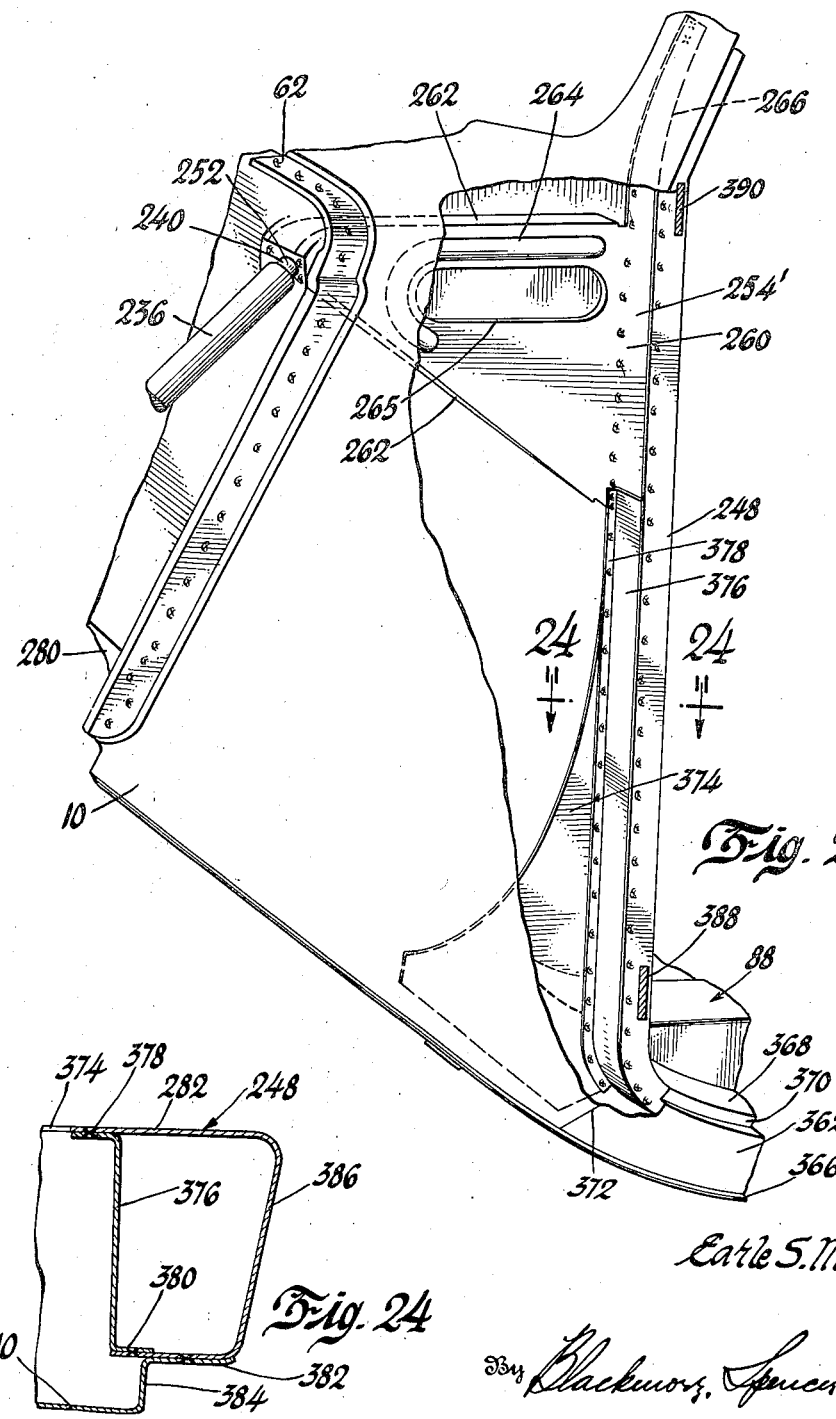

Aug. 27, 1940.  E. S. MacPHERSON  2,213,010
AUTOMOBILE BODY
Filed Aug. 5, 1935  14 Sheets-Sheet 10
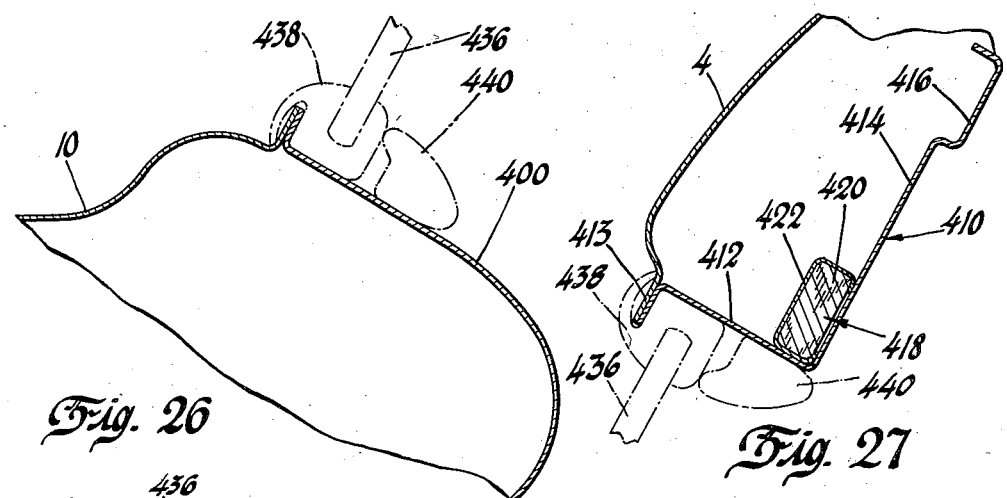
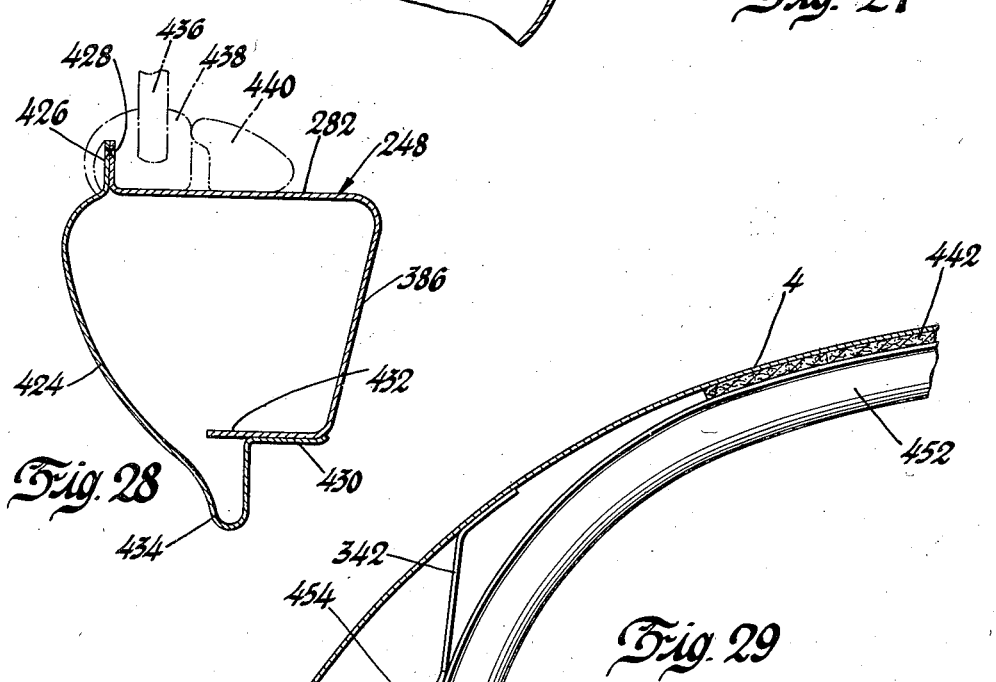
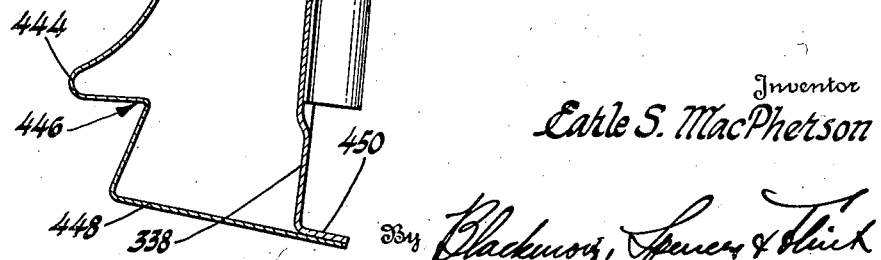
Inventor
Earle S. MacPherson Aug. 27, 1940.  E. S. MacPHERSON  2,213,010
AUTOMOBILE BODY
Filed Aug. 5, 1935  14 Sheets-Sheet 11
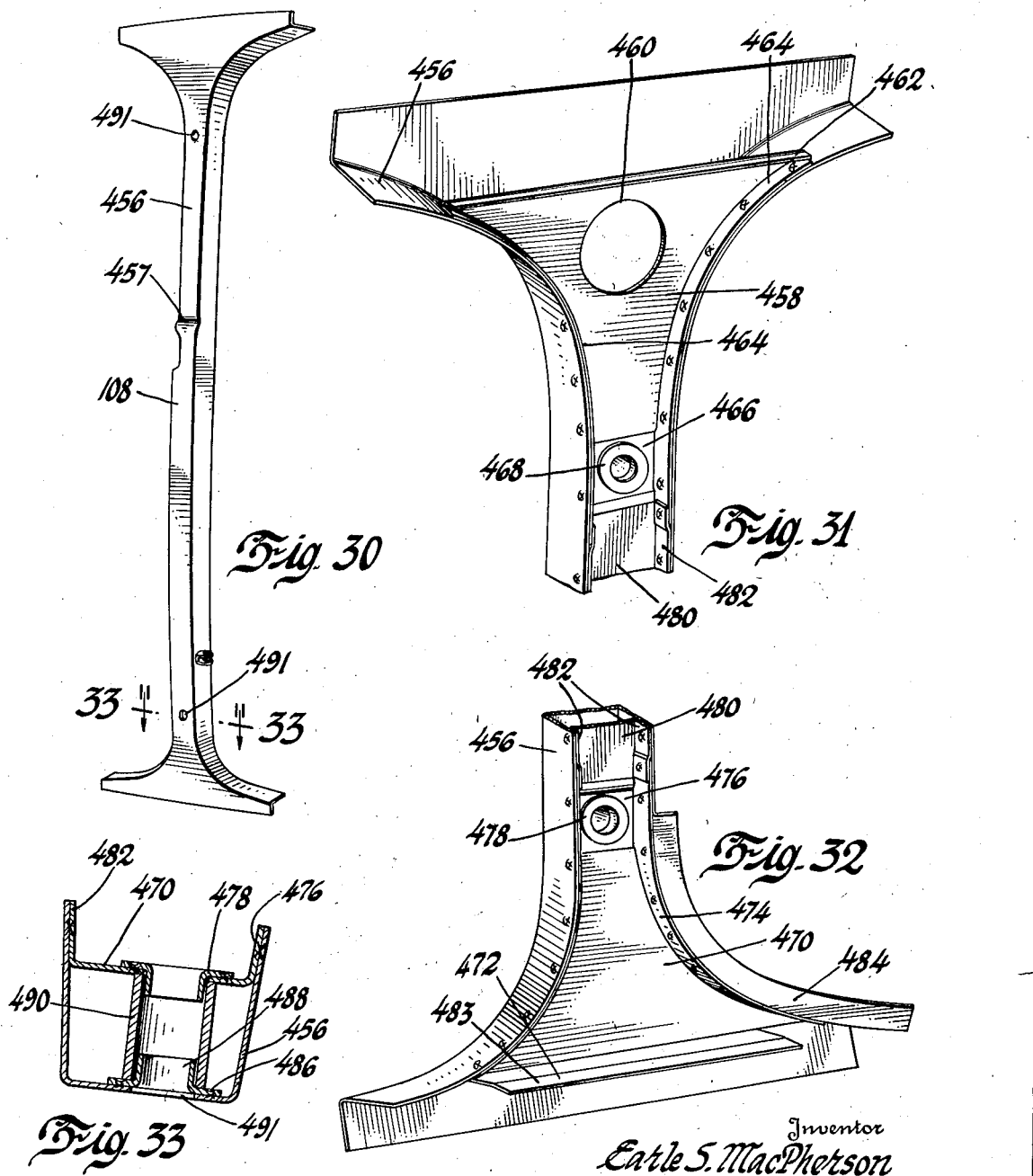

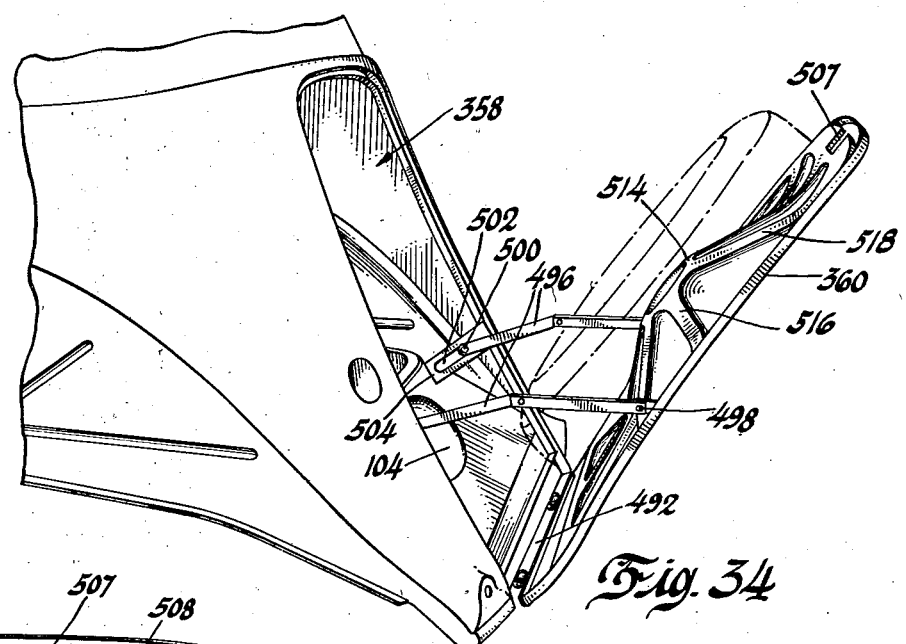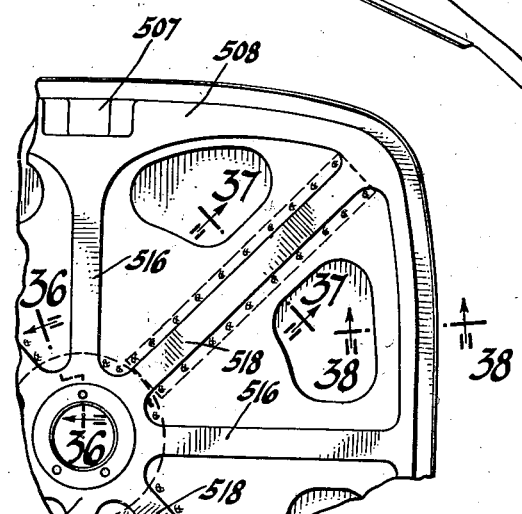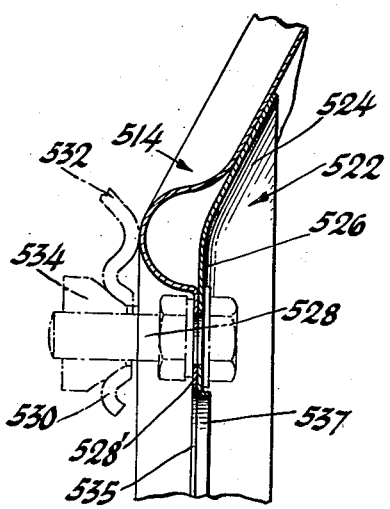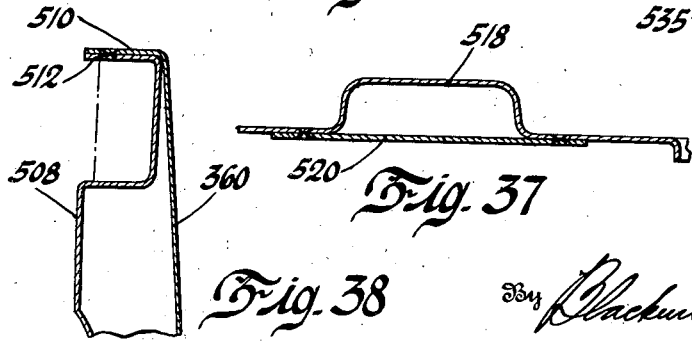

Aug. 27, 1940.  E. S. MacPHERSON  2,213,010
AUTOMOBILE BODY
Filed Aug. 5, 1935  14 Sheets-Sheet 13

Inventor
Earle S. MacPherson
By Blackmore, Spencer & Hink
Attorneys

Aug. 27, 1940.  E. S. MacPHERSON  2,213,010
AUTOMOBILE BODY
Filed Aug. 5, 1935  14 Sheets-Sheet 14
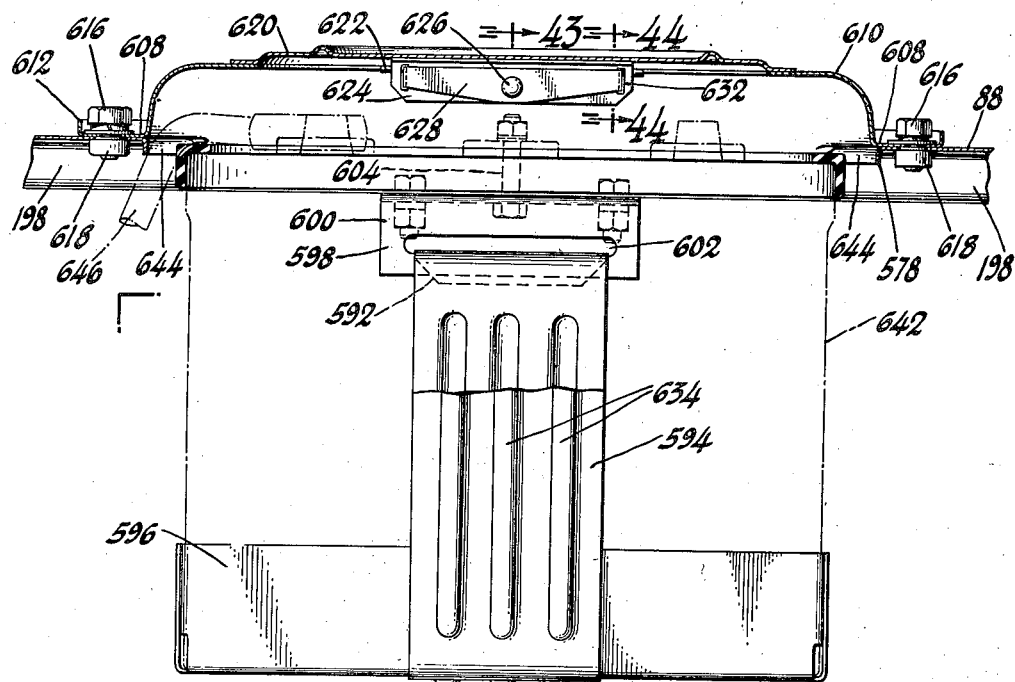
Fig. 42
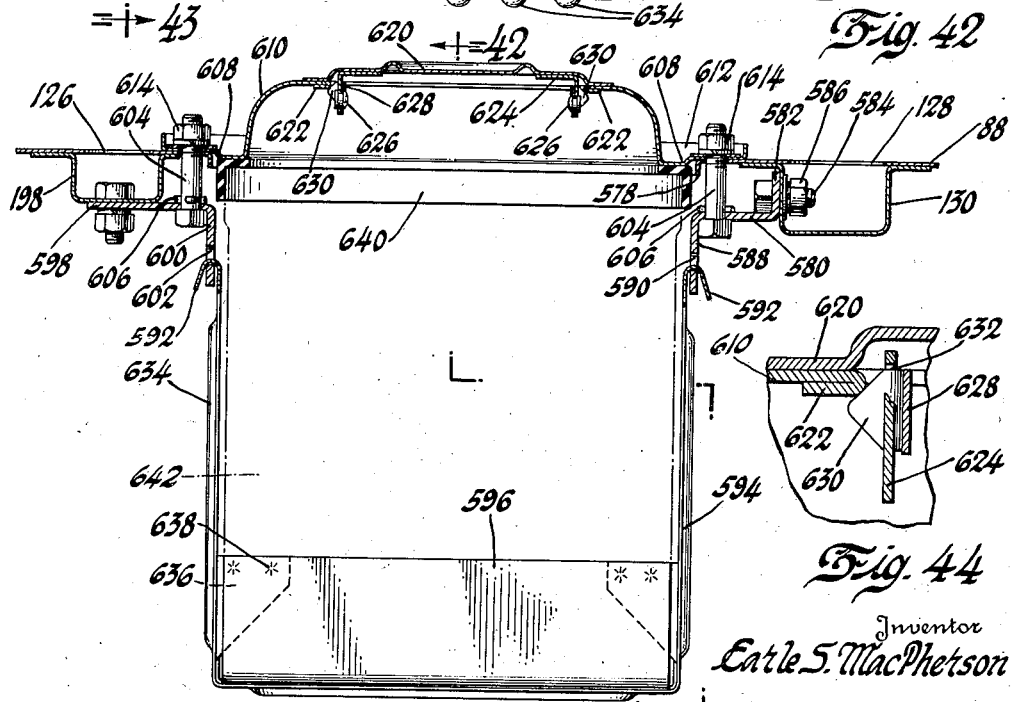
Fig. 43
Fig. 44
Inventor
Earle S. MacPherson
By Blackmore, Spencer & Flint
Attorneys Patented Aug. 27, 1940

2,213,010

UNITED STATES PATENT OFFICE 2,213,010

AUTOMOBILE BODY

Earle S. MacPherson, Grosse Pointe, Mich., assignor to General Motors Corporation, Detroit, Mich., a corporation of Delaware Application August 5, 1935, Serial No. 34,781

18 Claims. (Cl. 296—28)

This invention relates to metal automobile bodies and the object of the invention is to construct a body which will be able to withstand the wear and tear of modern usage and which is much lighter than the ordinary modern vehicle of the same size. The purpose of this lighter construction is to enable the car to be handled easier, to use less fuel, and to decrease the cost of manufacture.

In accordance with the invention the usual chassis is not used, and the body is constructed without depending on the ordinary chassis. The under portion of the body at the sides is formed into box sections to strengthen the body and the vehicle as a whole and make unnecessary the usual chassis. The floor or under pan of the vehicle is constructed of metal and is flanged at its sides to form part of the box section. The engine is mounted on a short subframe which is removably secured to the front portion of the under pan so that if it is desired to overhaul or inspect the engine, the subframe can be disconnected from the main portion of the vehicle, rendering the engine much easier of access.

Other novel features of the invention are the specific manner in which the hood is hinged to the body; the manner in which the spare tire is mounted on the inside of the hinged cover at the rear deck of the vehicle; the manner of mounting the springs; the bracing between the cowl and the front engine supporting frame; the mounting of the gasoline tank; the mounting for the shock absorbers; and the box-sectioned constructions around the door openings and at the vehicle sides.

On the drawings:

Figure 1 is a side view of a vehicle body construction in accordance with the invention, the hood being shown in its partially raised position in dotted outline.

Figure 2 is an enlarged detailed view with parts broken away showing the manner of holding the rear ends of the hood tightly against the cowl.

Figure 3 is a section on the line 3—3 of Figure 2.

Figure 4 is a sectional detailed view through the hinge of the hood.

Figure 5 is a sectional detailed view on the line 5—5 of Figure 2.

Figure 6 is a perspective view of the floor pan or under pan of the vehicle.

Figure 7 is a sectional detailed view on the lines 7—7 of Figures 6 and 8 showing one of the openings for mounting the rear springs or the shock absorbers.

Figure 8 is a tilted view (looking from below) of the rear side portion of the under pan.

Figure 9 is a front view of the cowl and engine subframe, and the manner of securing the same together.

Figure 10 is a sectional detailed view of the manner of securing the braces and cowl together.

Figure 11 is a sectional detailed view showing the manner of securing the short engine frame to the body.

Figure 12 is a section through the wheel housing at the gasoline tank, taken on the line 12—12 of Figure 13.

Figure 13 is an elevational view of the body per se with the doors removed and showing the various section lines on which other views have been taken.

Figure 14 is a section on the line 14—14 of Figure 13.

Figure 15 is a perspective view at the rear edge of the rear door opening showing the interior of the wheel housing and the manner of mounting the rear seat cushion.

Figure 16 is a perspective view of the top and rear deck of the body.

Figure 17 is a sectional view on the line 17—17 of Figure 13.

Figure 18 is a bottom tilted view of the front portion of the under pan.

Figure 19 is a section on the line 19—19 of Figure 6.

Figure 20 is a sectional detailed view on the line 20—20 of Figure 18, showing the mounting for the front end of the rear springs.

Figure 23 is a perspective view of a portion of the cowl with parts broken away better to illustrate the structure.

Figure 24 is a detailed view through the front door pillar taken on the lines 24—24 of Figures 13, 23 and 25.

Figure 25:
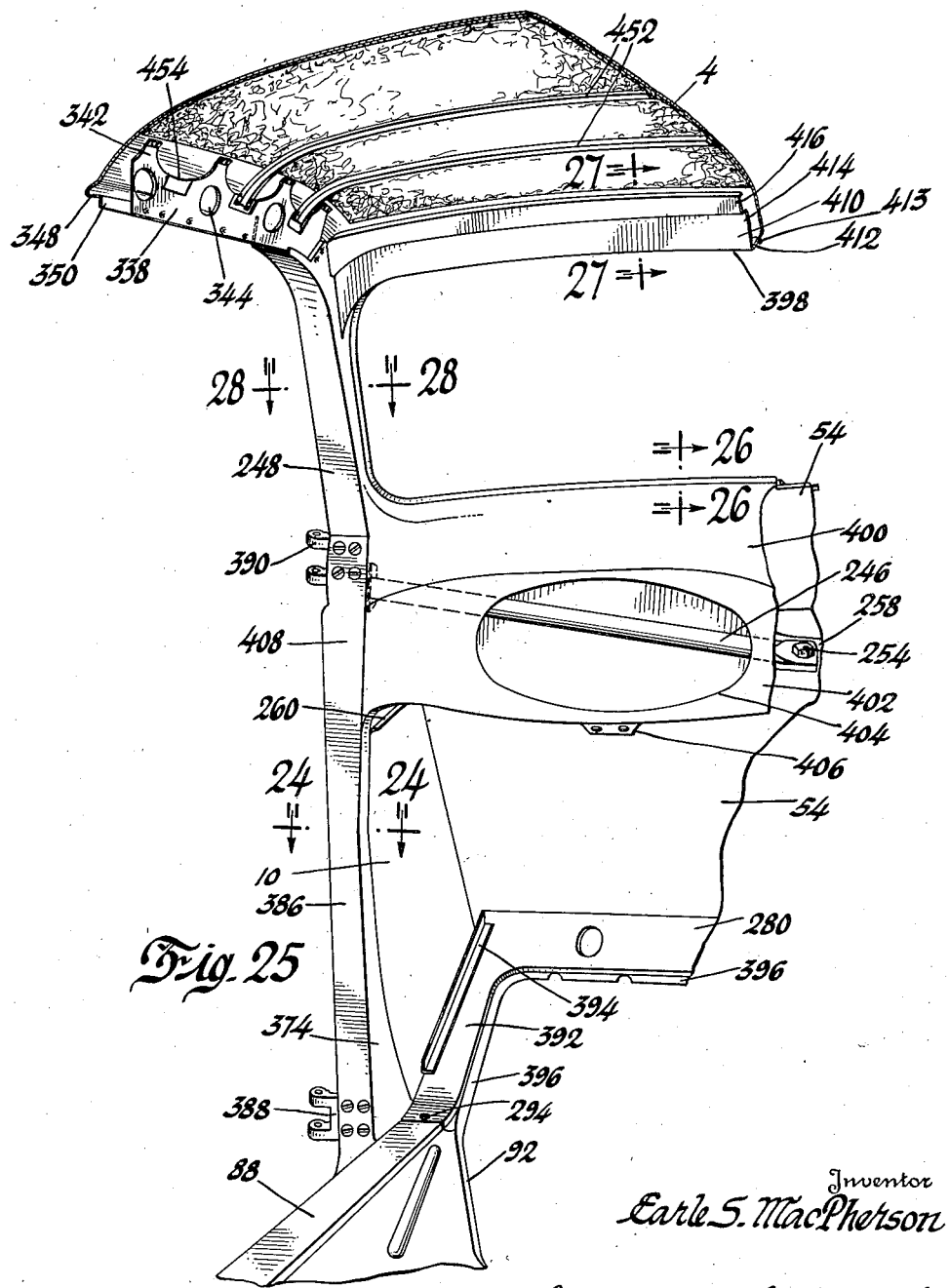
Figure 25 is a perspective view of a part of the front of the vehicle looking from the interior.

Figures 26, 27, and 28 are sectional views on corresponding lines of Figure 25.

Figure 29 is a sectional view on the line 29—29 of Figure 13.

Figure 30 is a perspective view of the door post.

Figure 31 is an interior perspective view of the front portion of the door post.

Figure 32 is a perspective view of the interior of the lower portion of the door post.

Figure 33 is a section on the line 33—33 of Figures 13 and 30.

Figure 34 is a view of the rear portion of the vehicle showing the deck door open and the tire in place in dotted lines.

Figure 35 is a view in elevation of a corner of the rear door looking from the interior.

Figures 36, 37 and 38 are sectional views on the corresponding lines of Figure 35.

Figure 39:
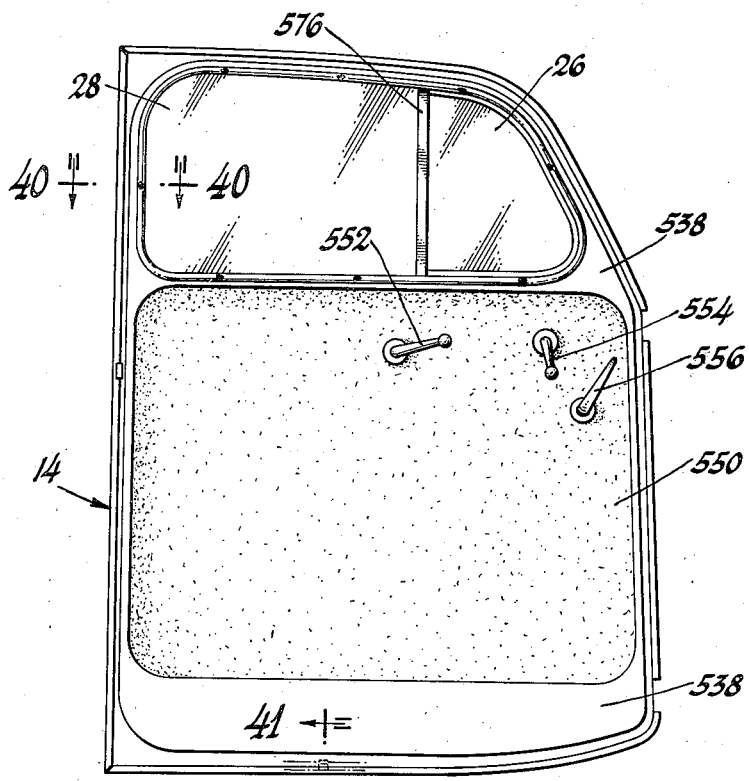

Figure 39 is an elevational view of the door looking from the interior of the vehicle.

Figures 40, 41:
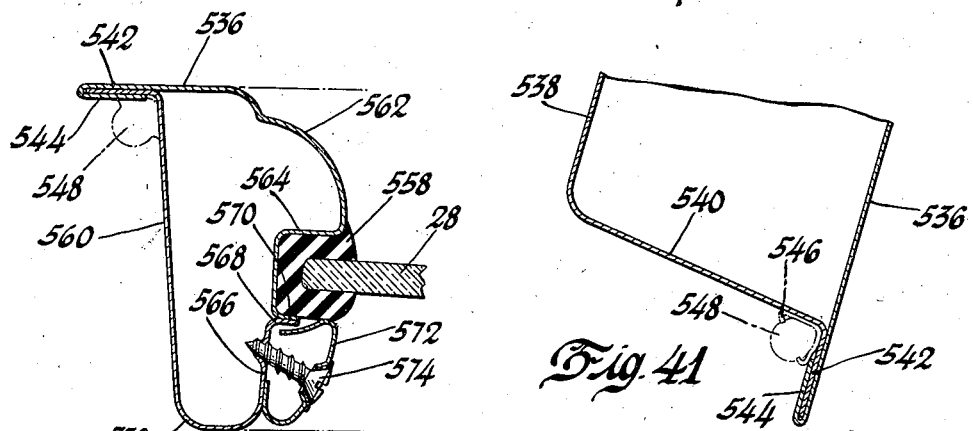

Figures 40 and 41 are sectional views on the corresponding sectional lines of Figure 39.

Figure 42 is a sectional view of the battery mounting on the line 42—42 of Figure 43, but showing the battery tray and strap in full lines.

Figure 43 is a sectional view on the line 43—43 of Figure 42, but showing the battery tray and strap in full lines.

Figure 44 is a sectional detail on the line 44—44 of Figure 42.

Referring to the drawings, the numeral 2 indicates the metal body as a whole. The body has the metal roof 4, the rear deck 6 integrally united thereto, the windshield 8, cowl 10, running boards 12, the front door 14, rear door 16, hood 18, lamps 19, front fenders 20, rear fenders 21, front wheels 22, and rear wheels 24. Both front and rear doors are provided with vertically pivoted ventilating windows 26 and vertically slidable windows 28. The hood, instead of having the usual sides hinged at the top, is unitary and is pivoted at its top rear center at the point indicated at 30 and has a single hook 32 at the front. The usual grating or side louvers for the hood are indicated at 34 and the usual grille at 36.

Referring to Figures 1–5 inclusive, the hood of the vehicle of the present invention distinguishes from the usual hoods in that the sides, top, and front are integral as is best indicated by the full and dotted line position in Figure 1. The hood is formed of as many pieces as practicable and these pieces welded into a single unit with the grille at the front and the louvers at the side. The hood has secured thereto at the inside thereof by welding a U-shaped bracket 38, and a reinforcing plate 40 is welded to the interior of the bracket 38. Through the members 38 and 40 there are passed the bolts 42 which pass through suitable openings 44 in the hinge arm 46, the opposite end of which is pivoted on the shaft 50 mounted at the ends of a bracket 52 welded to the interior of the cowl pan 54. The hinge arm 46 is held on the bolts 42 by means of the washers and nuts 56. The hinge arm 46 passes through an opening 58 in the cowl pan and has secured thereto a rubber block or washer 60 which closes the opening 58 when the hood is in lowered position as is best shown in Figure 4.

The cowl 10 is provided with a downturned portion 62 at its front edge forming a ledge on which the edge 64 of the hood 18 is adapted to seat. On the top of the ledge there is secured the usual anti-squeak fabric 66. An outwardly turned portion 68 on the edge of the cowl pan 54 extends under the ledge 62 and reinforces it.

At the sides of the hood the lacing is not secured to the ledge 62 as is best seen in Figure 5. The ledge 62 has its edge rounded and inturned as indicated at 70 while the lacing 72 is secured to the interior of the side edge 74 of the cowl 18. A suitable strip 76 is welded to the inner portion of the edge 64 and this strip 76 is provided with conventional tongues which engage the anti-squeak material 72 to hold it to the interior of the hood edge. The reason for applying anti-squeak material to the interior of the hood edge instead of to the ledge on the cowl at the sides is that when the hood is lowered from the dotted line position in Figure 1 to the full line position the sharp edge 74 of the hood would tend to cut or rub the anti-squeak fabric and cause it to deteriorate in a very short time. It is desired to have the edge 74 straight and uncurved so that it will properly mate with the corresponding edge on the ledge 62. By using the rounded margin 70 on the edge of the ledge 62 the fabric 70 on the edge of the ledge 62 the fabric of the anti-squeak material 72 will ride over the rounded edge and not be subject to injury by a sharp cutting edge.

In order to hold the hood securely in its down position, there is secured by welding at each side thereof and toward the bottom the U-shaped bracket 76' which is provided with an interior rounded rib 78. The sides of the U bracket 76' are inclined as is best shown in Figure 3. Secured to the interior of the cowl pan 54 is a spring hook 80, the end 82 of which is rounded as is best shown in Figure 2. When the hood is moved from the dotted line position in Figure 1 to the full line position, the hook 82 will pass through the opening formed by the U to cause the rounded edge or rib 78 to engage the hook 80 tightly to hold the rear edges of the hood in down position. To have access to the engine it is necessary to release the front hood latch 32 (which may be of any suitable type) only and then raise the hood. Along with the hood the grille 36 and side portions containing the louvers 34 will be raised so that access may be had to the engine and its associated and interrelated parts.

Referring to Figure 6, the under pan or floor pan of the vehicle is indicated as a whole at 84. The pan comprises the rear section 86 and the front section 88 integrally united as by welding as indicated at 90 in Figure 18. The pan 84 is formed to U shape 92 at its front to make room for the clutch housing and the transmission. It is provided throughout its extent with a plurality of strengthening ribs 94 and has an opening 95 for the battery. The battery is positioned under the front seat. The pan has a suitable channel formation shown at 96 to accommodate the drive shaft, suitable raised portions 98 to accommodate the shock absorbers and a further raised portion 100 to accommodate the differential housing for the rear axle. An opening 102 is provided at the rear for the gasoline tank and the depression 104 is for the reception of the lower end of the spare tire. (Compare Figure 34.)

The sides of the front portion 88 of the pan 84 are suitably formed as shown at 106 to mate with the corresponding lower portion of the center or No. 2 door pillar 108. (See Figure 13.)

A semicircular strengthening rib 110 (Figure 8) is provided at the rear of the pan immediately in front of the opening 102 for the gasoline tank, and this rib is covered by a strengthening plate 112 provided with a plurality of lightening openings 114.

The pan is generally depressed at its middle (as best shown at 192 in Figures 6 and 18) between the mountings for the front and rear seats. The metal of this depressed portion has formed therein the tubular formation 96 for the propeller shaft. The forward portion of the front seat 115' extends over the shaped portions 106 and over the inclined toe board 115, leaving toe room at the rear of the front seat for the passengers occupying the back seat 117.

The openings indicated at 116 are to mount the rear shackle of the rear springs, while the openings 118 mount the front ends of the rear springs. No spring shackle openings are provided at the front of the pan for the reason that the front end of the vehicle is mounted on independently sprung wheels.

The openings 120 are to mount the rear shock absorbers while the openings 122 are for the purpose of securing the rear end of the engine frame 124 (Figures 9 and 10).

The openings 126 at the front of the battery opening 95 and the openings 128 at the rear of the battery opening are to allow access to the bolts which support the battery mounting.

Suitable blocks 134 at the rear of the pan are for the purpose of attaching the rear bumper.

Referring to Figure 7, there is shown a detail of one of the openings 116 to mount the spring shackle or the shock absorber. The edge of the pan 84 is downwardly bent to form flanges as indicated at 136 and then again outwardly bent as indicated at 138. On the underside there is secured the reinforcing member 140, the length of which is best indicated in the perspective view in Figure 8. The reinforcing member 140 is welded to the flange 138 and extends inwardly of the pan a short distance beyond the openings 116 and is upwardly bent to form the upwardly extending web 142 and again flanged at 144 and welded to the bottom of the rear pan portion 84. This will form a box section, and in the box section the structure of the opening 116 is mounted. This structure includes the vertical tubular spacer 146 and the upper and lower fittings 148 and 150, respectively. Each fitting has a flange which overlaps the pan 84 and the reinforcing member 140, and a tubular portion 152 which extends into the tubes 146. All these parts are welded together. Suitable bolts or other securing means pass through the fittings 148 and 150 to secure the spring shackle or shock absorber in place.

Referring to Figure 8, it will be noted that the inner reinforcing member 140 of the box section extends from the end of the chassis frame inwardly a distance beyond the rib 110 and reinforcing plate 112. The member 140 terminates at substantially the point indicated at 154 in Figure 6. There is one of these reinforcing members at each side.

Referring to Figure 20, there is shown the structure 118 which forms the means of connecting the front end of the rear spring to the body. On the underside of the body there is applied a reinforcing member 156 secured to the underside of the pan as by welding. This plate 156 has a flat 158 formed thereon and in the flat 158 and in the pan 84 suitable openings are formed which mate with the tubular spacer 160. Suitable upper and lower fittings 162 and 164, respectively, have flanges which overlap the pan 84 and the reinforcing plate 158 and have tubular formations 166 which extend into the spacer 160. All these parts are suitably welded together. The reinforcing plate 158 has a portion 168 inwardly bent against the interior of the downwardly extending flange 136 on the pan and has its edge 170 welded thereto. The structure 118, as shown in Figure 20, permits the passage of a bolt to secure the front end of the rear spring.

The rear of the bottom pan 84 is shaped as best shown in Figure 19. The pan has the downwardly extending flange 172 at its extreme rear end and beyond the flange the end is inclined as at 174. A bottom reinforcing plate 176 extends entirely across the vehicle and has the rear flange 178 which is welded to the flange 172 and the lateral flanges 180 which are welded to the side flange 136 of the pan. The plate 176 has its forward edge flanged as at 182 and is welded to the lower edge of the web of a reinforcing plate 184. The plate 184 has the upper flange 186 welded to the underside of the under pan 84, and a lower inwardly extending flange 188 which rests on and is welded to an inturned flange 190 on the lower edges of the side flange 136 of the pan 84.

Referring to Figure 18, the depressed portion of the pan to accommodate the feet of the rear seat passengers is indicated at 192. The side flange 136 is provided with four lightening holes 194 and the smaller holes 196 for the reception of bolts to secure the frame 124 to the body. The bottom of the pan below the front seat is provided with U-shaped reinforcing channels 130 and 198 having side flanges 199 which are spot welded to the underside of the pan. The channel 130 has the opening 200 which corresponds to the opening 122 (Figure 6) to receive a bolt 306 (Figure 11) to secure the rear end of the frame 124 to the body.

Referring to Figure 15, the pan 86 at the end of the tubular portion 96, or at the rear door pillar, is provided with a transverse reinforcing member and seat support 202 which is welded at its ends and edges by means of flanges 203 to the pan 86 and to the adjacent structure. The reinforcing member 202 is provided with a plurality of lightening holes 204. The front edge of the rear seat pad rests on the top horizontal web 206 of the member 202. The member 202 with the floor pan 86 forms a box section and strengthens the vehicle at the rear edge of the rear door opening.

Referring to Figure 12, the gasoline tank opening 102 has an upwardly projecting strengthening rib 208 extending entirely therearound. The rib terminates in an inwardly projecting ledge 210 and a downwardly projecting flange 212. The gasoline tank 214 (shown in dotted outline) has an upper marginal flange 216 which rests on the ledge 210. A suitable anti-squeak or packing material 218 is positioned between the ledge 210 and flange 216, and suitable screw bolts 220 pass through openings in the flange 216, the anti-squeak material, and the ledge 210 rigidly and removably to hold the tank in place.

As best shown in Figure 20, the forward portion of the pan 84 has channels 221 at both sides. The channel is formed by the upwardly bent portion 222, the lateral portion 224, and the downwardly extending flange 136. This structure forms a downwardly opening channel at both sides of the pan.

Referring to Figures 9, 10, and 11, the frame member 124 comprises the two lateral bars 226 connected at their forward ends by a transverse member 228 and at the rearward ends by transverse members 230. The frame 124 supports a dead axle 232 terminating in journals 234 upon which the independently sprung wheels 22 are mounted. The frame 124 supports the usual engine.

Extending diagonally from each side member 226 of the frame to the cowl 54 are the supporting tubes 236. These tubes are secured at their lower ends at 238 to the frame bar 226 and at their upper ends at 240 to a flat on the cowl pan 54. The second set of tubes 242 and 244 have their lower ends secured as at 238 to the frame bar and their upper ends secured as at 240 to a flat 256 on the cowl pan 54. This second set of tubes 242 and 244 extend upwardly and inwardly of the vehicle, or tend to converge from the frame bars toward the cowl pan. The manner in which the tube ends are secured at 240 is best indicated in Figures 10, 23, and 25.

Referring to Figures 10 and 25, there is provided interiorly of the cowl a pair of bracing tubes 246 which extend from the center part of the cowl inwardly and diagonally to the front or No. 1 door post 248. The ends of the tubes 246 at the cowl pan 54 coincide with the ends of the tubes 242 and 244 as best shown in Figure 10. The tubes 246 are flattened at 250 and provided with bolt openings and the tubes 242 and 244 have a head 252 rigidly secured in the end thereof. The head is internally threaded and a bolt 254 is passed through the openings in the flattened portions 250 of the tube 246, through an opening in a flat 256 on the cowl, and screw threaded into the head 252. This forms a rigid and permanent structure and is additionally reinforced by a plate 258 at the flat 256.

The junction 240 between the ends of the tubes 236 at the cowl pan 54 is similar to that shown in Figure 10 except that instead of the tube 246 a substantially triangular shaped bracket 260 (Figure 23) having an inwardly directed flange 262 is secured inside the cowl as by welding at 264 to the No. 1 door post 248 and at its forward end by welding to the cowl pan and the ledge 62 of the cowl. Each tube 236 has a head 252 secured therein, and a bolt similar to the bolt 254 is passed through an opening in the flange 262 and screwed into the head 252. A reinforcing plate similar to the reinforcing plate 258 is also used. The plate 254' is provided with a strengthening rib 264 and with a lightening opening 265, and an arm 266 extends upward into the hollow post 248 and is secured thereto.

Figures 21, 22:
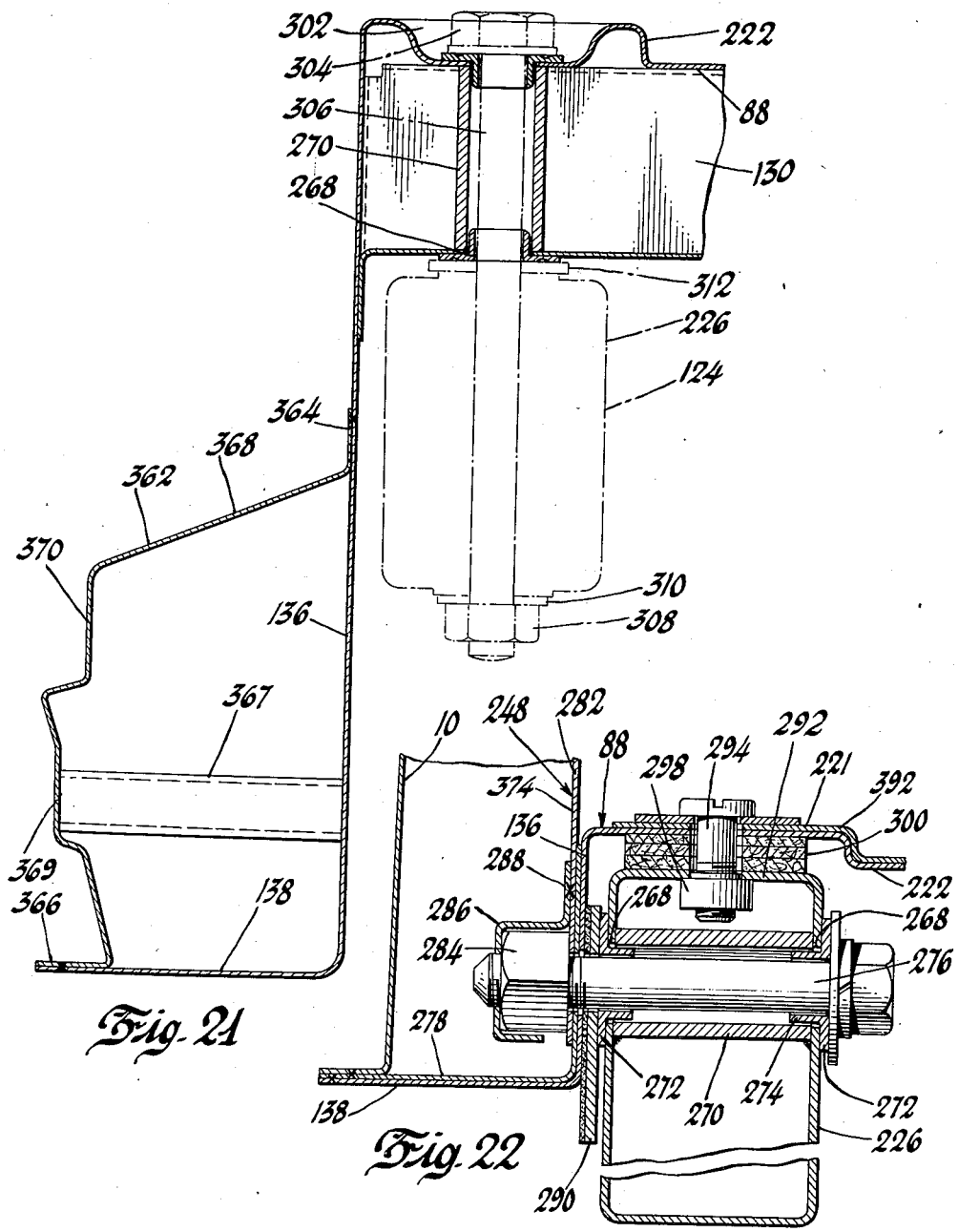
Figure 21 is a section through the edge of the body at the front door taken on the line 21—21 of Figure 13.
Figure 22 is a sectional detailed view on the line 22—22 of Figure 11, showing the manner in which the front portion of the engine frame is secured to the body.

In Figures 11, 21, and 22 the manner in which the side bars 226 of the frame 124 are secured to the forward portion of the under pan 88 is shown. The side members 226 of the frame are tubular or box sectioned as best shown in Figure 22 and are provided with openings 268, and interiorly of the side bar at the openings 226 a spacer 270 is secured as by welding. Fittings 272 having inwardly directed annular flanges 274 are welded to both sides of the opening, the flanges 274 extending into the spacer 270. A bolt 276 extends through the flanges 274 and through an opening in the downwardly extending flange 136 of the forward under pan section 88. The flanges 136 and 138 of the pan section 88 are reinforced at the point where the bolt 276 extends therethrough by an angle extension 278, a continuation of the toe board 280, integral with the dash pan 54. The horizontal portion of the extension 278 is welded to the horizontal flange 138 of the flange 136. The flange 138 is much wider at the forward portion of the pan 84 than at the rear portion thereof as is best seen in Figures 6 and 22. The point at which the bolts 276 are passed through the side bars 226 is further strengthened by the No. 1 door post 248. The bolt passes through a broadened bottom portion 374 of inner wall 282 of the post (see Figures 22 and 23) and into a nut 284 permanently secured in place by means of the cap 286 welded at 288 to the portion 374 of the door post. Suitable shims 290 of metal and/or fabric are used between the outer fitting 272 and the inside face of the flange 136.

The upper wall 292 of the side bar 226 is secured to the channel 221 of the pan 88 by means of a bolt 294 which is screw threaded into a nut 298 rigidly secured as by welding to the inside of the side bar. Suitable fabric shims or spacers 300 are used between the pan 88 and the upper flange 292. The bolt 294 also passes through the arms 392 of the toe board 280 which overlies the tine of the fork 92 of the pan 88.

At the rearmost end of the frame the side bars 226 are secured to the channel cross member 130 by the structure shown in Figure 21. The channel 221 at the edge of the pan 88 is provided with the depression 302 for the reception of the head 304 of a bolt 306. The bolt passes through a structure in the channel 130 in all respects similar—except for slight dimensional differences—to the structures shown in Figures 7, 20, and 22. The bolt 306 extends through the side bar 124 (which has therein a structure the same as shown in Figures 7, 20 and 22) and a nut 308 is secured thereto at its lower end. The usual washers 310 are used and a spacer 312 is shown between the bar 124 and the channel 130.

Referring to Figure 11, between the front bolts 276 and the rear bolt 306 three additional bolts 314 are used. These bolts 314 do not pass all the way through the side bars 226, but the bars are provided with openings 316 on their inner sides, the bolts 314 passing through the outer side only of the side bars 226. From the side bars they pass through the openings 318 in the flange 136 of the pan. The openings 318 are positioned between the lightening holes 194.

Referring to Figure 14, a section through the door opening at the rear wheel housing is shown. The outer shell or panel of the body is indicated at 322. This panel is provided with a rabbet 324 to serve as a door jamb and with the flat face 326 which extends inwardly of the door. The wheel housing portion is indicated at 328 while a reinforcing member is indicated at 330. The reinforcing member 330 begins at the bottom of the arch of the wheel house indicated by the numeral 332 in Figure 13 and extends to the top of the arch indicated at 334. The member 330 is channel shaped in cross section as indicated in Figure 14, and has its sides spot welded to the adjacent parts. The wheel housing 328 is provided with the usual strengthening ribs 336 as shown in Figure 13.

In Figure 17 there is shown a section through the rear or No. 3 pillar. The outer panel of the body is shown at 322, the rabbet at 324, and the inwardly extending door jamb at 326. These portions are continuations of the correspondingly numbered portions in Figure 14. The reinforcing member is shown indicated at 338 and comprises a metallic member having the flange 340 welded to the edge of the jamb 326 and to the fingers 342 at the other end of the reinforcing members, the fingers 342 being welded to the body panel 322. The reinforcing member is provided with a suitable number of lightening holes 344, each of which is flanged inwardly as indicated at 346. The member 328 extends from the point indicated at 334 upwardly around the door opening and forwardly at the edge of the top to the windshield at the No. 1 post 248 as is shown in Figure 25, this figure better showing the fingers 342. From Figures 14 and 17 it is to be noted that the rear or No. 3 door pillar as well as the edge of the top over both doors is formed into a box section which greatly adds to the strength of the body. The top of the vehicle is flanged inwardly as indicated at 348 and then downwardly at 350 (Figure 25). The flange 350 is spot welded to the edge of the reinforcing member 338.

Figure 16 shows in perspective the top 4, the rear deck 6, and the wheel housing 328. The structure is of metal and may be made of as many pieces as is convenient. Where the parts meet they are suitably welded together to form an integral unit. The rear deck is provided with the window openings 352 which are inwardly flanged as at 354 to form a reinforcement, and between the two windows there is the reinforcing channel 356. The rear deck has an opening 358 to receive the usual hinged door 360 (Figure 34) to enable entrance to be had to the compartment at the back of the rear seat. Forwardly directed flanges 361 are provided at the rearmost part and outwardly directed flanges 363 at the bottom. These flanges are spot welded to the under pan 84.

In Figure 21 there is shown the outer reinforcing member 362 (which forms the outer lower surface of the body) and with the flanges 136 and 138 of the side pan forms a box section. The member 362 has the upper flange 364 and lower flange 366 which are welded to the flanges 136 and 138 respectively. A suitable inclined face 368 serves as the lower portion of the door jamb. The running board is secured to the flat at 369 and to the flanges 138 and 366. The box section formed by parts 362 and 136 has a plurality of spacing tubes 367 installed at suitably spaced intervals, the tube structure being the same as shown in Figures 7, 20, 21, 22, and 33, and is for the purpose of receiving bolts to support the running board. The openings 369 in Figures 6, 11, and 18 represent the openings at the ends of the tubes. The face at 370 serves to receive the overlap flange of the door. The member 362 extends from the rear edge of the rear door forwardly across the bottom of both doors and terminates at the line 372 shown in Figure 13, where it is welded to the cowl 10.

Referring to Figure 24, there is shown a section through the No. 1 door pillar. The pillar is indicated as a whole at 248 and is U-shaped in cross section, the U facing toward the front of the vehicle and closed by an upright strip 376 having inner flange 378 and the outer flange 380 both of which are spot welded to the post 248. The plate 376 closes the post and forms therewith a box section. The cowl panel 10 is also spot welded to the post by means of the flange 382, the cowl being first inturned as at 384 to form with the flange 382 a rabbet for the overlap of the door. The jamb face on the pillar is indicated at 386. At its bottom portion the pillar is broadened or extended forwardly as indicated at 374 to reinforce the pillar and the structure at the bottom thereof. The hinges for the front door are indicated at 388 and 390.

In Figure 23 at the line indicated by 372 the cowl panel 10 meets the end of the box section member 362 and is butt welded thereto.

Referring to Figure 25, there is shown the cowl panel 54 and the toe board 280 integral therewith. The toe board has the lateral arms 392 which are secured by welding to the ends of the fork 92 at the front of the floor pan. The outer sides of the arms 392 are also downwardly flanged and secured to the sides of the cowl panel. A flange extends rearwardly of the vehicle (as indicated at 278 in Figure 22) and is secured between the enlarged portion 374 of the inner side of the door post and the flange 136 at the side of the pan. The toe board has a reinforcing angle 394 at its sides where it joins with the cowl panel 10, and also a rabbeted edge 396 to support the toe boards.

The windshield opening is indicated at 398. From the windshield opening the instrument panel 400 extends inwardly in curved formation and at the end of the curve extends downwardly and slightly forward to form the portion 402 on which the instruments are mounted. A suitable opening 404 is provided for the instruments and the bracket 406 is provided on which to mount the steering column bracket. The instrument panel 400 is welded to the No. 1 posts at the sides of the line indicated by 408.

At the top of the windshield there is provided a transverse header member 410. This member has the lower flange 412 which is secured to the edge flange 413 of the roof 4 as by welding. The header is then upwardly turned to form a face 414 at the end of which there is formed the channel 416. Inside the header at the angle formed by the sides 412 and 414 there is provided a tacking strip 418 comprising a twisted paper or wooden core 420 surrounded by a metal sheath 422 open at the face 414. This member may be secured in place in any suitable way, such as by welding. The face 414 is provided with suitable openings to allow the passage of fastening means for securing the lining in place. Other similar strips are applied where needed.

In Figure 28 there is shown a section through the No. 1 door pillar 248 at the windshield opening. Instead of the reinforcing strip 376 shown in Figure 24, there is used the pillar cap 424 having the inner flange 426 welded to an inturned flange 428 on the inner face 282 of the pillar and an outer flange 430 welded to the outer flange 432 of the post. A suitable rib formation 434 is given to the post at the door opening to form a continuation of the rabbet shown at 384 in Figure 24.

The glass of the windshield is indicated at 436. The glass has the usual rubber or fabric channel 438 therearound to form a liquid tight connection with the adjacent structure. The windshield is held in place by the strip 440 which may be of any suitable kind and secured in any suitable way.

Referring to Figure 29 there is shown the edge of the roof over the rear door opening and the manner in which the sound deadening material 442 is positioned. The outer edge of the roof has the projection 444 and the rabbet 446 formed therein to receive the overlap flange at the door. This structure differs slightly from that shown in Figure 25. The bottom edge of the reinforcing member 338 is provided with an inwardly extending flange 450 which is welded to the end of the flange 448, the lower side of which forms part of the jamb face of the door. A plurality of arched channel shaped transverse ribs 452 extend across the vehicle and conform in shape to the rounded shape of the top 4. At their sides they are secured as by welding to the bottom of the cut-out 454 formed in the making of the fingers 342. The sound deadening and insulating material 442 is held between the top 4 and the arches or bows 452 and extends from one side of the roof to the other.

Figures 30-33 inclusive show the center or No. 2 door pillar indicated as a whole at 108. The pillar comprises the integral outer shell portion 456 which is generally I-shaped, and channel shaped in cross section as best shown in Figure 33, and is suitably formed at 457 to conform to the belt line of the vehicle. The upper inner portion of the pillar has the reinforcing member 458 flared at its top and provided with a lightening opening 460. This member has lateral flanges 464 and the top flange 462 which is welded to the roof portion 465 (Figure 16), the flanges 464 conforming in shape to the upper flared portion of the pillar and being spot welded to the post sides to form a box section. At the bottom the reinforcing member 458 is inwardly depressed as indicated at 466 and provided with an opening. In the opening there is received the fitting 468 to receive a bolt for the upper door hinge. The bottom of the pillar has a flared reinforcing member 470 similar to the reinforcing member 458 and provided with flanges 472 and 474 similar to the flanges 462 and 464. These flanges are spot welded to the shell 456 and form therewith a box section. A similar depression 476 is formed, and the fitting 478 is secured in an opening in the reinforcing member 470 and receives the bolt for the hinge at the bottom of the door. Between the reinforcing members 458 and 470 there is provided the reinforcing strip 480 having the lateral flanges 482 by means of which it is spot welded to the shell 456 and gives thereto a box section throughout its entire length. A lower flange 483 on the reinforcing member 470 is welded to the floor pan 88. At the bottom of the pillar 108, at one side, the shell 456 is provided with a flange 484 which is arcuate in form and conforms in shape to the shape of the edge of part 106 of the floor pan shown in Figure 6. These two parts are secured together as by spot welding.

In Figure 33 there is shown a section through the upper and lower hinge bolt openings of the pillar. Inasmuch as both hinge bolt openings are the same, a description of one will suffice for both. Inside the box formation of the pillar there is secured a fitting 486 spot welded to the inside of the shell 456. The fitting 486 has an inwardly extending tubular portion 488, and over the tubular portion and extending to the inside face of the reinforcing member 470 there is a spacing tube 490. This may be suitably welded in place. The inner fitting 478 extends into the spacer 490 and is suitably welded in place. The shell has the openings 491 mating with the spacer tube 490, the hinge bolts passing through the openings 491 and the tube 490 and secured at the inside of the pillar.

In Figures 34-38 inclusive there is shown the rear deck door and the manner in which the spare tire is mounted thereon. The door 360 is hinged at its bottom at 492 and is provided with the pivoted links 496 at each side to prevent it from swinging open too far. The links are pivoted at 498 at one end to the door and at the other end 500 they are provided with suitable rollers which operate in slots 502 in brackets 504 secured to the inside of the vehicle at the rear of the wheel housings. The door has the usual handle 506 (Figure 1) and is provided with the usual catch (not shown) mounted at 507.

The door is of sheet metal and the outside configuration thereof is flat. On the inside it is reinforced by the reinforcing plate 508. This plate has an outward configuration which closely follows the shape of the door and is secured to the flange 510 of the door by means of the flange 512 on the reinforcing plate, the parts being secured together by spot welding. The reinforcing member 512 has the hump 514 at its middle and from the hump toward the edges there radiate the channel formations 516. There are eight channels, or one channel for each 45°. The longer channels 518, or the channels which extend to the extreme corners of the reinforcing member, have a plate 520 welded thereto to form a box section, this structure being best shown in Figure 37. This box section forms an unusually rigid structure. The shorter channels 516 are left open.

Referring to Figure 36, at the interior of the hump there is welded the reinforcing member 522. This member is partially conical in shape as indicated at 524 to conform to the shape of the hump and has a flattened part 526 to conform to the central flat 528' on the hump. These two flat portions are secured together by spot welding. The welded flanges 526 and 528' have openings therethrough for the passage of bolts 528 which pass through openings in the flange 530 of the wheel 532 and secure the spare wheel in place. To remove the wheel the door is opened and the nuts 534 on the bolts 528 are unscrewed and will allow the wheel to be removed. Both the flat 528' on the hump and the flat 526 on the member 522 have the mating central openings 535, and an annular flange 537 is provided on the flat 526 at the opening.

Figures 39, 40, and 41 show the front door 14. The door comprises the outer panel 536 and an inner panel 538. The inner panel has on its four sides the lateral flange 540 which spaces the panels from each other, the flange 540 being in turn flanged at its edge as at 542 and having bent thereover a flange 544 of the outer panel 536. The two flanges 542 and 544 form the overlap of the door. At the angle formed by the flanges 540 and 542 there are secured a plurality of clips 546 which hold in place a suitable rubber or packing strip 548 to prevent the door from rattling and to form a tight joint.

The panel 538 has a cut-out portion which is covered by a cardboard or cloth panel 550. Referring to Figure 39, it will be noted that the cardboard 550 covers but a part of the inside of the door. The part not covered shows exposed portions of the inner panel 538 and these exposed panel portions form the inner surface of the door and are uncovered. These panel portions may be finished with a paint or finish of suitable color to conform to the interior color or scheme of the vehicle.

The door is provided with the usual sliding window 28 operated by a suitable mechanism controlled by the handle 552. The ventilating window 26 is pivoted intermediate its sides and is controlled by a mechanism operated from the handle 554. The handle 556 controls the usual door latch.

In Figure 40 there is shown a section through the door at the movable window 28, this window sliding in the usual window guides 558. The jamb face of the door 560 is the face of the flange 540. The post portion 562 of the panel 536 has the rabbet 564 for the reception of the window guide channel 558 and at the interior of the vehicle the inner panel 538 is bent inwardly at the window opening as indicated at 566 and has a flange 568 which is welded to a similar flange 570 at the end of the rabbeted portion 564. A retaining strip 572 is held in place by short screws 574 which pass into an opening in the flange 566.

The usual upright guide 576 (channeled on the side facing the window 28 and rabbeted on the side facing the ventilating window 26) is positioned between the windows and is rigidly secured at its top and bottom to the adjacent parts of the door.

The structure of the rear door 16 is the same as that of the front door 14, there being a difference in the shape only of the rear door caused by the wheel housing 328.

Figures 42, 43 and 44 show the manner of mounting the battery. The opening 96 in the front section 88 of the pan (Figure 6) has a downturned flange 578 therearound to strengthen the edge of the opening.

At the rear side of the opening 96 a Z-shaped bracket 580 is fastened to the side of the channel 130 by means of the flange 582 and a bolt 584 and nut 586. The other flange 588 of the Z-shape bracket has an opening 590 to receive the hooked end 592 of a U-shaped strap 594 which supports a battery tray 596. At the other side of the opening 96 there is similarly supported on the channel 198 an L-shaped bracket 598, the arm 600 of which is provided with an opening 602 similar to the opening 590 to support the other hooked end 592 of the strap 594.

Through the webs of the Z-shaped bracket 580 and the L-shaped bracket 598 there are passed the bolts 604. Each bolt is provided with an opening immediately above the brackets and through the openings there are passed the pins 606 to retain the bolts on the brackets. The bolts pass upwardly through openings in the under pan section 88 and through openings in a rim 608 on a cover 610 which extends over the opening 96. The rim 608 has the strengthening edge flange 612. Suitable nuts 614 on the bolts 604 hold the cover 610 in position.

Additional openings are provided at the edge of the opening 96 in pan section 88 and conformable openings are made in the rim 608 to receive the bolts 616. Suitable nuts 618 are applied over the bolts 616 and aid in holding the cover on the pan 88. The bolts 616 are preferably positioned at the sides of the opening 96 90° from the bolts 604 and have their heads secured to the underside of the pan 88 such as by welding.

On the underside of the rim 608 of the cover 610 there is secured as by welding the ring 640 right angularly shaped in cross section as best shown in Figures 43 and 44. This ring is for the purpose of resting on the battery indicated in dotted lines at 642 and is adapted rigidly to hold the battery in place.

The cover 610 has an opening at its top which is closed by a removable lid 620. The edges of the opening in the cover 610 are rebent as shown at 622 and on the inside of the lid 620 at opposite sides thereof there are secured as by welding the angle members 624 which have spring fingers 628 secured thereto by means of rivets 626 applied at their mid points. The ends of the fingers are inturned as indicated at 630 and pass through openings 632 in the ends of the angle member 624. The position of the parts in the secured position of the lid is best shown in Figure 44. In this position the lid is held in place by the engagement of the inturned ends 630 under the rebent portion 622. By applying a pointed instrument such as a screw driver under the edge of the lid 620 it may be pried from the cover 610, the spring in the fingers 628 enabling the turned ends 630 to be pushed inwardly by and to pass over the turned over edge 622. When the lid is to be reapplied it may be snapped into place by striking on the top thereof such as by a blow from the fist. This will cause the spring fingers 628 to yield to the pressure exerted by the edge 622 and cause the inturned ends 630 to snap under the edge 622.

The lid 620 is to allow inspection of the battery and the cover 610 to allow removal or replacement of the battery.

The strap 594 is provided with a plurality of ribs 634 at its sides and bottom for the purpose of adding strength thereto. The pan 596 is formed of a flat sheet of metal, the edges of which are bent upward, and at the corners the metal at 636 is inturned and welded as indicated at 638 to the adjacent side of the tray.

At the sides of the battery 642 the opening 96 is provided with recesses or indentations 644 (Figure 42) to provide openings for the entrance and exit of the electric connections 646 of the battery.

The parts described are of metal and except where removability is desirable, as in the case of the gasoline tank 214, the battery lid 620, cover 610, and strap 594, the engine frame 124, etc., all are rigidly and permanently secured by welding.

I claim:

1. In a vehicle body, a floor pan extending the length and breadth of the body, a body shell mounted on said pan and having front and rear door openings, a transverse reinforcing member of channel section extending across the body over the pan and at the rear of the rear door opening, said member being secured to the pan and to the shell and forming with the pan a box section cross member.

2. In a bracing means between the front end of a vehicle body and an engine supporting frame, a plurality of braces extending from the frame to and rigidly secured to the cowl pan of the vehicle, a plurality of braces extending from the inside of the cowl to the front door pillars and secured to said first named braces and to the pillars.

3. In a pan for a vehicle body, said pan extending substantially the length of the body, a rear reinforcing member extending transversely of the pan on the underside thereof and secured at its ends and rear side directly to the pan, a reinforcing plate extending transversely of the pan at the front of the reinforcing member and secured to both the pan and reinforcing member to form a box-sectioned construction.

4. In a bracing means between the front end of a vehicle body and an engine supporting frame, a plurality of braces extending upwardly from the frame to the outer edges of the cowl and rigidly secured thereto, and reinforcing members inside the cowl secured to the ends of the braces and to the cowl and extending to and secured to substantially the middle of the front door pillar.

5. In an underpan for the body of an automotive vehicle, a rear flat part to support the rear seat, a transverse strengthening rib in said rear flat part, and a plate over said rib and secured to said flat part to form a box-sectioned construction.

6. In an automobile body, an underpan extending the full width of the vehicle, downwardly turned flanges at the lateral edges of the pan, outwardly turned flanges at the bottom of the downwardly turned flanges, and a reinforcing member secured to the flanges and forming therewith a box-sectioned construction, said reinforcing member having a jamb face for the bottom of the door.

7. In an automobile body, an underpan extending the width of the vehicle, a front frame detachably secured to said underpan, a front door pillar rising from and secured to said pan, a cowl secured to the pan and to the pillars, braces inside the cowl at substantially the middle of the door pillar and extending from the pillar to the front of the cowl and secured to both pillar and cowl, and braces extending from the front frame upwardly and rearwardly to the cowl and secured to the cowl pan and to the first-named braces.

8. In an automobile body, a metal roof having curved edges, inturned flanges at the lateral edges of the roof, downturned flanges on said inturned flanges, reinforcing members welded to the roof and to the last-named flanges and forming with the roof edges a box-sectioned construction, and transverse roof supporting ribs secured at their ends to the reinforcing members.

9. In an automobile body, a metal roof having a rounded edge at its front over the windshield, a flange formed on the roof edge over the windshield, a substantially L-shaped header member extending across the vehicle over the windshield, a flange on said member at one of the legs of the L mating with and welded to the flange on the roof, a reinforcing channel formed at the end of the other leg of the L, and a tacking strip secured in the corner of the L-shaped member.

10. In a body for a vehicle having front and rear seats, a floor pan extending the length of the body and supporting the seats, said pan having a depressed portion intermediate its ends and between the front and rear seats, the depression being of a length to extend under the rear of the front seat whereby to provide foot room for the rear seat passengers, said rear seat being positioned on the pan to the rear of the depression, and a transverse stiffening member secured to the pan at the front of the rear seat and acting as a seat support, said member forming with the pan a box-sectioned construction.

11. In a body for a vehicle adapted to be mounted by means of springs and shock absorbers, a floor pan extending the length of the body, lateral flanges formed on the pan, one flange at each side, longitudinal reinforcing members, one member secured to each side of the pan and forming with the respective flange a box-sectioned construction, and means in the box-sectioned construction to attach the springs and shock absorbers.

12. In a body for a vehicle adapted to be mounted by means of springs and shock absorbers, a floor pan extending the length of the body, lateral flanges formed on the pan, one flange at each side, longitudinal reinforcing members, one member secured to each side of the pan and forming with the respective flange a box-sectioned construction, means in the box-sectioned construction to attach the springs and shock absorbers, and a transverse channel-shaped stiffening member secured to the underside of the pan and extending between the box-sectioned constructions and forming with the pan a box-sectioned construction.

13. In a body for a wheeled vehicle adapted to be equipped with shock absorbers, a floor pan extending the length of the body, lateral flanges formed on the pan, one flange at each side, longitudinal reinforcing members, one member secured to each side of the pan and forming with the respective flange a box-sectioned construction, and protuberances formed in the pan at the sides thereof adjacent the box-sectioned construction to accommodate the shock absorbers.

14. In an automobile body, an underpan construction comprising a single metal element only extending the full width of the vehicle, downwardly turned flanges, one flange at each lateral edge of the pan, outwardly turned flanges, one flange at the bottom of each of the downwardly turned flanges, and longitudinally extending reinforcing members secured to the flanges at the angle therebetween and forming therewith a box-sectioned construction, one reinforcing member for the flanges at each side.

15. In a bracing means between the front end of a vehicle body and an engine supporting frame, a plurality of braces extending from the frame to and rigidly secured to the cowl pan of the vehicle, a plurality of braces extending from the inside of the cowl to the front door pillars and secured to said first named braces and to the pillars, flats formed on the cowl pan, said flats being out of the plane of the pan and said braces secured at their ends to said flats.

16. In a bracing means between the front end of a vehicle body and the engine supporting frame, said body having a cowl pan, braces extending from the frame to the central part of the cowl pan, braces extending from the frame to the outer edges of the pan, and means connecting the first named braces to the door posts of the vehicle.

17. In a bracing means between the front end of a vehicle body and the engine supporting frame, said body having a cowl pan, braces extending from the frame to the central part of the cowl pan, braces extending from the frame to the outer edges of the pan, and means connecting the second named braces to the door posts of the vehicle.

18. In a bracing means between the front end of a vehicle body and the engine supporting frame, said body having a cowl pan, braces extending from the frame to the central part of the cowl pan, braces extending from the frame to the outer edges of the pan, and means connecting all of said braces to the door posts of the vehicle.

EARLE S. MACPHERSON.